Aug. 25, 1964  E. A. HEDLUND  3,145,557

CONTACT GAP MEASURING DEVICES

Filed Oct. 24, 1960

INVENTOR:
EVERT A. HEDLUND
BY
HIS ATTYS.

United States Patent Office 3,145,557
Patented Aug. 25, 1964

3,145,557
CONTACT GAP MEASURING DEVICES
Evert A. Hedlund, 119 Westgate, Winnipeg 1,
Manitoba, Canada
Filed Oct. 24, 1960, Ser. No. 64,617
1 Claim. (Cl. 73—1)

My invention relates to new and useful improvements in devices adapted to measure relay contact gaps.

Multiple contact relay normally used in highly specialized electronic installations such as radar, are normally activated by a coil which can be energized and de-energized, said coil moving an armature plate which in turn makes or breaks the various contacts.

It will be appreciated that not only must these contacts make and break at the correct time when the armature is actuated but also that it is extremely important that the movable fingers of the contacts move through a certain distance only. In highly specialized electronic work such as radar, the movement of these movable points is measured in thousandths of an inch and the distance moved by the various contacts has to be carefully gauged with conventional feeler gauges and the necessary adjustments made.

It will be appreciated that with the enumerable number of relays utilized in present electronic equipment, such measuring and gapping of relays is a time consuming and particularly intricate operation.

I have overcome the disadvantages present in existing methods by providing a device which can be engaged upon the armature whereupon the instant of making or breaking the contacts together with the distance travelled by the movable contacts can readily be ascertained by a direct reading micrometer scale associated with my device.

It is desirable, of course, to utilize conventional indicating means such as a battery and ohm-meter across the contacts so that the exact moment of making or breaking can be ascertained.

The principal object and essence of my invention is therefore to provide a device of the character herewithin described which is readily attachable to a relay and which enables the necessary make and break measurements to be made rapidly and accurately.

Another object of my invention is to provide a device of the character herewithin described which is suitable for use with the relays in position upon the electronic equipment.

A still further object of my invention is to provide a device of the character herewithin described in which a plurality of relays can rapidly be matched for make and break characteristics and also for movable contact point distance travelled characteristics.

A yet further object of my invention is to provide a device of the character herewithin described which is adapted to be clamped to the relay body thus leaving the operator's hands free to make the necessary adjustments if desired.

A still further object of my invention is to provide a device of the character herewithin described which is simple in construction, economical in operation, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
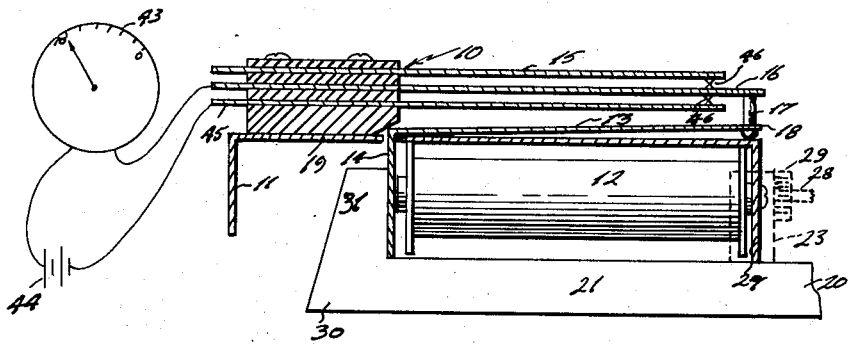
FIGURE 1 is a side elevation showing my device clamped to a conventional relay.
Figure 2:
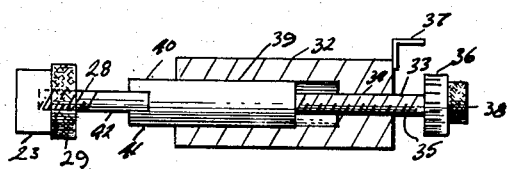
FIGURE 2 is a side elevation of the gauging block and clamp attachment portion of my device.
Figure 3:
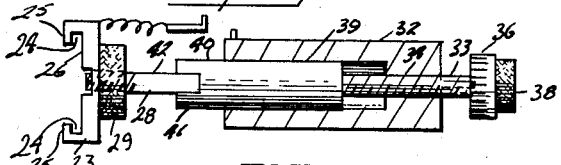
FIGURE 3 is a top plan view of FIGURE 2.

Proceeding therefore to describe my invention in detail, reference should first be made to FIGURE 1 of the drawings in which I have shown a conventional multi-contact relay collectively designated 10 consisting of a substantially U-shaped yoke body 11 carrying an energizing coil 12 therewithin and an angulated armature plate 13 including the downturned end 14 of said plate which is influenced by the coil 12 by the conventional manner.

The plurality of make and break contacts are shown at 15 and the central actuating contact strip 16 is actuated by the upstanding portions 17 secured to one end 18 of the armature plate 13, it being understood that the armature plate is pivotally mounted through a slot 19 within the yoke 11.

My device collectively designated 20 consists of an elongated body portion or bar-shaped member 21 preferably manufactured from plastic or the like and including an extension 22 forming a handle by which the device can be held by the oprator while fitting same into position.

Intermediate the ends of the body portion 21 is a clamp 23 slotted as at 24, said slots being formed by inturned flanges 25 formed upon the front face 26 of the clamp and these slots 24 are adapted to receive one down-turned lug 27 of the aforementioned relay yoke 11 by which the device is supported upon the relay.

Figure 4:
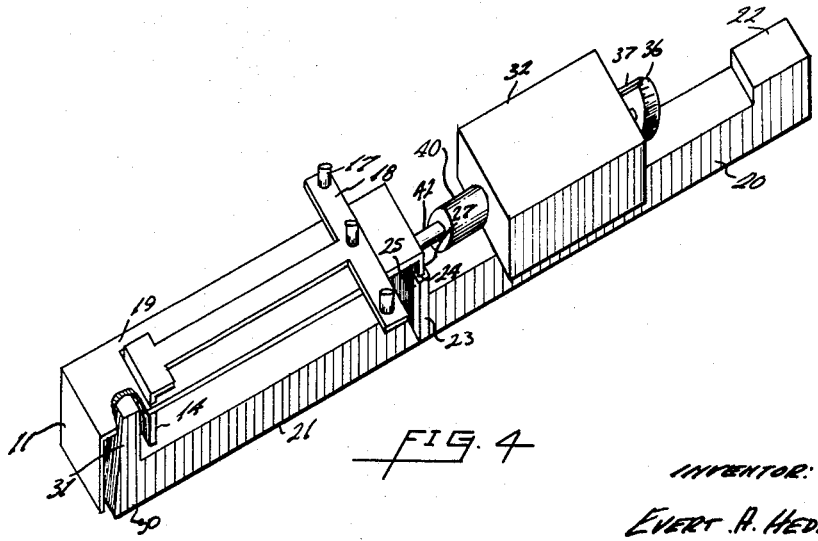
FIGURE 4 is a schematic view of my device shown in position upon an armature body, the contact assemblies having been removed for clarity.

A clamping screw 28 extends through a screw-threaded aperture in the clamp 23 and is actuated by means of the knurled shoulder 29 secured to the screw 28. When the lug 27 of the relay is fitted within the slots 24, the knurled shoulder 29 is turned thus tightening the screw against the lug and securing the device to the lug as shown in FIGURE 4.

At one end 30 of the body portion 21, I have formed a laterally projecting armature plate engaging finger 31 and this is adapted to engage one side of the downturned portion 14 of the armature plate as clearly shown in FIGURE 1.

A block 32 is secured to the member 21 intermediate the ends thereof and is longitudinally apertured as at 33. One end 34 of this longitudinal aperture is screw threaded and adapted to receive a micrometer adjustment screw 35 which includes an engraved cylinder 36 upon the outer end thereof.

This cylinder is preferably engraved and divided into 25 incremental parts which, if the screw threaded portion 34, has 40 threads to the inch, will permit accurate incremental adjustment of one thousandth of an inch with relation to a pointer 37 secured to the block 32.

As is conventional with micrometer instruments, a slip clutch screw 38 is associated with the cylinder 36 so that said cylinder can be zeroed to the gauge pointer 37 during operation.

The opposite end 39 of the longitudinal drilling 33 is smooth bored and receives slidably a cylindrical connecting plug 40 which is engageable by the end 41 of the aforementioned micrometer screw 35.

This plug is apertured within the outer end 41 thereof to receive the opposite end 42 of the aforementioned tightening screw 28 thus making a direct connection between the micrometer screw 35 and the yoke 11 of the relay being checked.

Finally, an indicating device such as an ohm-meter 43 may be wired in series with a battery 44 to a pair of the contacts 45, the contact points 46 of which are being checked.

In operation, the clamp 23 is positioned upon the lug 27 of the relay whereupon the clamp screw 28 is tightened thus securing the device firmly to the relay.

The ohm-meter is wired across the points desired to be checked and the micrometer adjustment screw is rotated until the finger 31 engages the armature plate 14 whereupon the cylinder 36 is zeroed by the slip clutch 38.

By rotating the micrometer screw and watching the ohm-meter 43, the exact moment of contact breaking may be ascertained.

The cylinder 36 may again be zeroed and the micrometer screw rotated further until the exact distance travelled by the movable contact is ascertained also by means of the ohm-meter and battery.

It will therefore be seen that either making or breaking or distance travelled of multiple contacts can be checked rapidly and accurately by the direct reading micrometer cylinder 36.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

A portable device for in situ measurement of contact gaps of a relay having a relatively stationary yoke portion and a relatively movable contact actuating armature portion spaced from said yoke portion, said device comprising an elongated bar-like member forming a handle at one end thereof, a laterally projecting finger provided integrally at the other end of said member and adapted to abut the armature portion of a relay, a block secured to the intermediate portion of said member on the same side thereof to which said finger projects, a plug slidable in said block toward and away from said finger, said plug having a first end in said block and a second end projecting from the block in the direction of the finger, a clamping screw coaxial with and operatively connected to the outer end of said plug, a slotted clamp adapted to receive therein the yoke portion of a relay, said clamp having a screw-threaded aperture receiving said screw whereby the entire device may be clamped into position on the relay in situ when the screw is tightened, and micrometrical adjustment means carried by said block coaxially with said plug and engaging said first mentioned end of the plug for moving the latter and the associated clamp toward and away from said finger.

References Cited in the file of this patent
UNITED STATES PATENTS

| | | |
|---|---|---|
| 411,444 | Irmen | Sept. 24, 1889 |
| 923,446 | Schellenbach | June 1, 1909 |
| 2,199,236 | Bigwood | Apr. 30, 1940 |
| 2,467,499 | Schachtleber | Apr. 19, 1949 |
| 2,521,917 | Holliday | Sept. 12, 1950 |